United States Patent [19]

Horner, Jr. et al.

[11] Patent Number: 5,161,452
[45] Date of Patent: Nov. 10, 1992

[54] VACUUM VALVE FOR BRAKE BOOSTER

[75] Inventors: Charles B. Horner, Jr.; Walter W. Last, Jr., both of South Bend, Ind.

[73] Assignee: Allied-Signal Inc., Morristown, N.J.

[21] Appl. No.: 796,172

[22] Filed: Nov. 22, 1991

[51] Int. Cl.5 .............................................. F15B 9/10
[52] U.S. Cl. ......................................................... 91/376 R
[58] Field of Search ..................... 91/369.1–369.4, 91/376 R

[56] References Cited

U.S. PATENT DOCUMENTS 2,415,035  1/1947  Penrose .............................. 91/376 R
4,953,446  9/1990  Fecher et al. ...................... 91/369.3

FOREIGN PATENT DOCUMENTS 48411  11/1984  Japan ................................... 91/369.2

Primary Examiner—Edward K. Look
Assistant Examiner—F. Daniel Lopez
Attorney, Agent, or Firm—Leo H. McCormick, Jr.; Ken C. Decker

[57] ABSTRACT

A poppet valve for a vacuum brake booster. The poppet valve is connected to a key number which retains a control valve in a bore of a hub of a brake booster. The poppet valve controls fluid communication between a first chamber and a second chamber in the booster while the control valve only controls fluid communication between the bore and the second chamber.

6 Claims, 2 Drawing Sheets

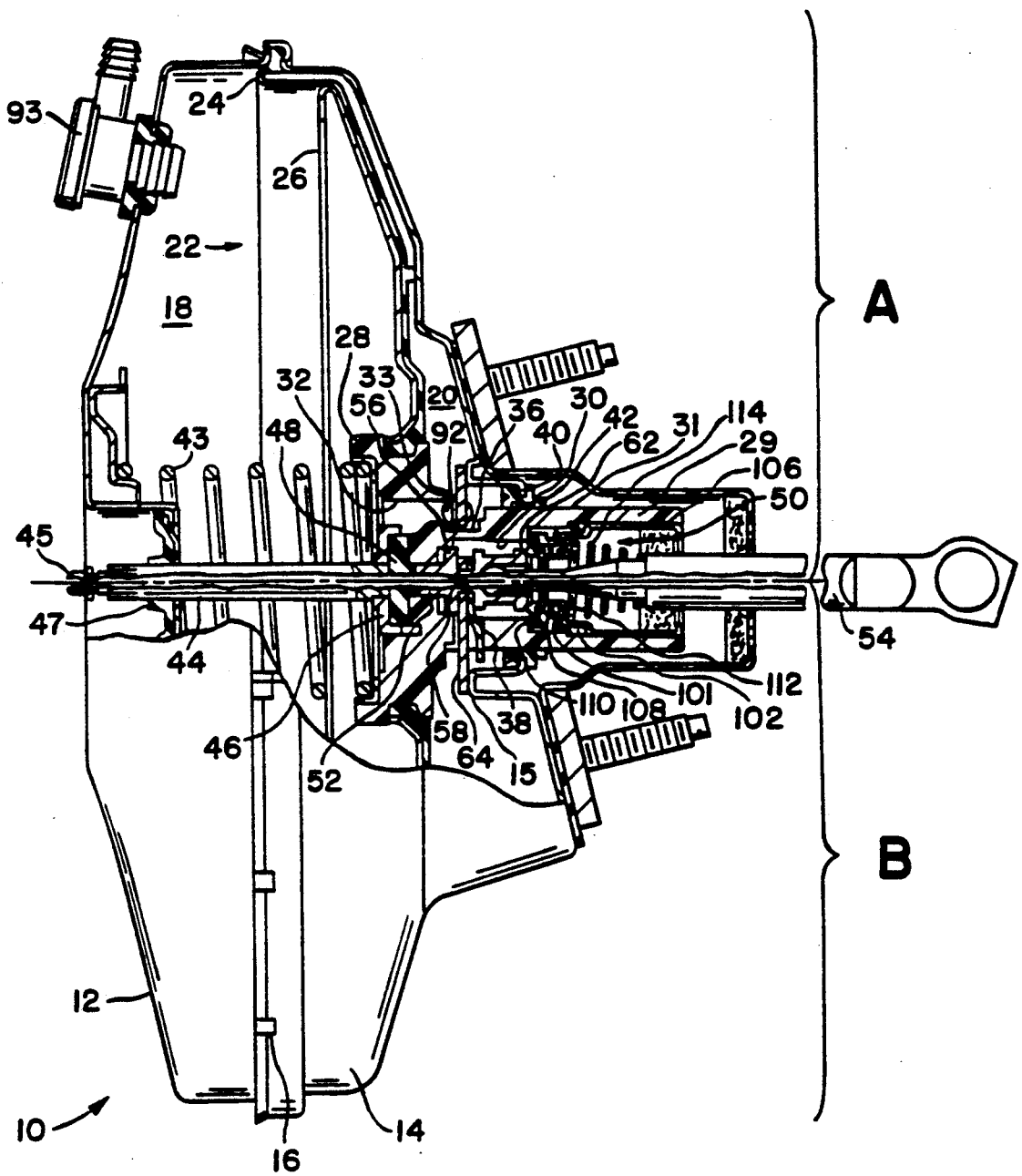
FIG. I

VACUUM VALVE FOR BRAKE BOOSTER

This invention relates to a poppet valve connected to a key member which retains a control valve in the bore of a vacuum brake booster.

In brake systems having boosters to assist in operating a master cylinder to supply wheel brakes with pressurized fluid, it is common practice to utilize a pressure differential created between vacuum produced by the operation of an internal combustion engine and presented to a first chamber in the booster and air of the surrounding environment presented to a second chamber. The development of the pressure differential occurs in response to an input applied to move a control valve which initially interrupts communication of vacuum between first and second chambers and thereafter allows air to flow to the second chamber to produce the pressure differential across a movable output wall corresponding to the input force. U.S. Pat. No. 3,279,327 discloses this well known manner for the operation of a vacuum brake booster wherein the hub which carries the control valve has a bore which is connected to the first and second chambers. A plunger of the control valve moves past a vacuum port in the bore to interrupt communication between the bore and second chamber and thereafter a vacuum port is opened to allow air to be communicated to the second chamber for the development of the desired pressure differential.

In an effort to reduce the time required to effect a brake application, a control valve, of the type illustrated in U.S. Pat. No. 3,289,547 was developed to control the development of the operational pressure differential. In this type control valve, the passageway for communication of vacuum between a first chamber and bore was relocated and a vacuum seat for the control valve was created in the bore. A poppet member of the control valve was located in the bore and connected to the input push rod attached to the brake pedal. Movement of a plunger connected to the push rod allowed a spring to move the poppet member into engagement with the vacuum seat to immediately interrupt communication of vacuum through the bore to the second chamber. Thereafter, further movement of the plunger of the control valve allowed air to be presented through the bore to the second chamber where a pressure differential corresponding to a desired braking force is created.. This type of control valve performs in an adequate manner to meet most brake applications.

Recently brake boosters have been developed having a further reduction in the actuation time required to develop an output force. This reduction in time is achieved by placing the control valve in a ready position when the control valve is in the rest position. Several devices have been proposed but the structure disclosed in U.S. Pat. No. 4,953,446 has been accepted by most vehicle manufacturers as the simplest to manufacture.

We have performed an analysis of vacuum brake boosters and have developed a brake booster which can further reduce the actuation time of a brake booster. In this brake booster, a hub has a first passageway directly connecting the first and second chambers to eliminate fluid communication through the bore in which the control valve is located. Fluid communication through this first passageway is controlled by a poppet valve. The poppet valve is carried on a key member which retains the control valve in the bore of the hub. The poppet member is aligned with a seat on the hub surrounding the first passageway. After a brake application terminates, a return spring moves the hub toward a rest position adjacent the rear shell. As the hub approaches the rest position, the key member engages a stop on the shell of the booster. The key member holds the poppet valve stationary as the movable wall and hub continue to move toward the rest position by the action of a return spring. When the poppet valve engages the seat, fluid communication between the first chamber and second chamber is restricted or terminated. When an operator desires to effect a brake application, an input force applied to the push rod immediately moves the plunger away from an atmospheric seat to allow air to enter into the bore and be communicated to the second chamber. A spring clip connected to the hub acts on the key member to maintain engagement of the poppet with the seat during a brake application. On termination of a brake application, the valve return spring moves the plunger and key member in a slot on the hub such that the poppet member is unseated from the seat to allow unrestricted fluid communication through the first passageway between the first and second chambers. The unrestricted fluid communication allows air to be evacuated from the second chamber through the first passageway. As the wall and hub approaches the rear shell of the booster, the key engages the stop on the rear shell to hold the control valve stationary. Further movement of the hub brings the seat into engagement with the poppet valve to interrupt communication between the first and second chambers when the hub, wall and control valve are in the rest or ready position.

It is an object of this invention to provide a brake booster with a poppet valve carried by a key member to control direct fluid communication of vacuum between a first chamber and second chamber and a control valve carried by a hub to control the communication of air to the second chamber.

It is an object of this invention to provide a brake booster with a poppet valve to control the evacuation of air from control chamber to an operational chamber and a control valve to control the communication of air to the control chamber.

It is a further object of this invention to provide a poppet valve associated with a key member to control the communication of vacuum between a first chamber and a second chamber in a brake booster.

It is another object of this invention to provide vacuum brake booster with a key member for retaining a control valve in the bore of a hub and for positioning a poppet valve with respect to a passageway to control fluid communication between a first chamber and a second chamber.

These objects and the advantages provided by the simplified hub structure and valving of this invention should be apparent from viewing the drawings wherein:

FIG. 1 is schematic illustrations of sectional views of first and second segments A and B of a brake booster, segments A and B are located at 90° to each other, the brake booster which includes a hub, key member, poppet valve and control valve arrangement made according to the principles of this invention, is shown in the rest or ready position with communication of fluid interrupted through a direct passageway in the hub that connects a first chamber with a second chamber;

Figure 3:
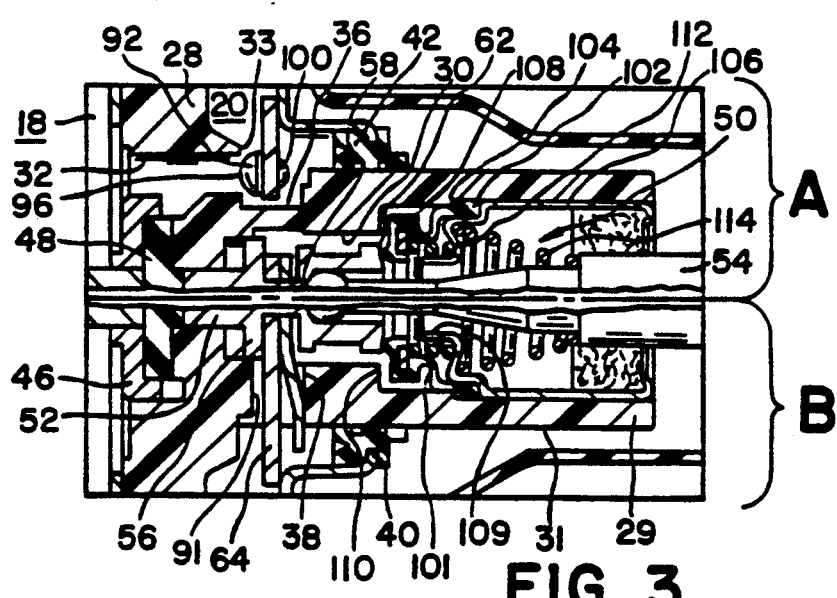
FIG. 3 is an enlarged sectional view of segments A and B of FIG. 1 showing the hub, key member, poppet valve and control valve in a release position when a brake application has been terminated and a return spring is moving the hub toward the rest position.

The servomotor 10 shown in FIG. 1 is designed to be connected to a master cylinder in a brake system to assist in providing an output force for operating the master cylinder to effect a brake application. The servomotor 10 is designed to be quiet, efficient and provide an immediate response to an input force to develop the output force for operating the master cylinder.

The servomotor 10 has a front shell 12 joined to a rear shell 14 by a series of lances and tabs 16 to form a sealed housing. The interior of the sealed housing is divided into a front chamber 18 and a rear chamber 20 by a movable wall 22. The movable wall 22 includes a diaphragm 24, backing plate 26 and a hub 28. Hub 28 has a cylindrical body 29 with a stepped bore 30 that extends therethrough, a first and second passageway 32 (only one is shown) which is substantially parallel with bore 30 that directly connects chamber 18 to chamber 20, peripherial slots 36 (only one is shown) on surface 31 of housing 29 and a radial slot 38 that extends through cylindrical body 29 to connect bore 30 with the second chamber 20. The cylindrical body 29 extends through an opening 40 in the rear shell 14 to connect bore 30 with the surrounding environment. A seal 42, of the type disclosed in U.S. Pat. No. 4,898,081, secured in opening 40 engages the exterior surface 31 of cylindrical projection 29 to seal chamber 20 from the surrounding environment.

The head 46 of an output push rod 44 is located in the stepped bore 30 of hub 28 while end 45 extends through seal 47 in shell 12. Head 46 which surrounds and locates a reaction disc 48 located in bore 30 communicates an output force from hub 28 to a piston in the master cylinder.

A control valve 50 located in bore 30 has a plunger 52 connected to an input push rod 54 attached to a brake pedal. Plunger 52 has first flange 56 that engages bore 30 to establish a bearing surface on hub 28, a groove 58, and a semi-spherical annular atmospheric seat 62 located of the end thereof. Plunger 52 is retained in bore 30 by key member 64. Annular poppet 101 has a bead 102 held against a shoulder 104 by a retainer 106 and a free end with an annular atmospheric seat 108 thereon urged toward a stop 110 by a first spring 112. A spring 114 located between push rod 54 and retainer 106 urges annular face 62 on plunger 52 toward seat 108.

Figures 4, 5, 6:
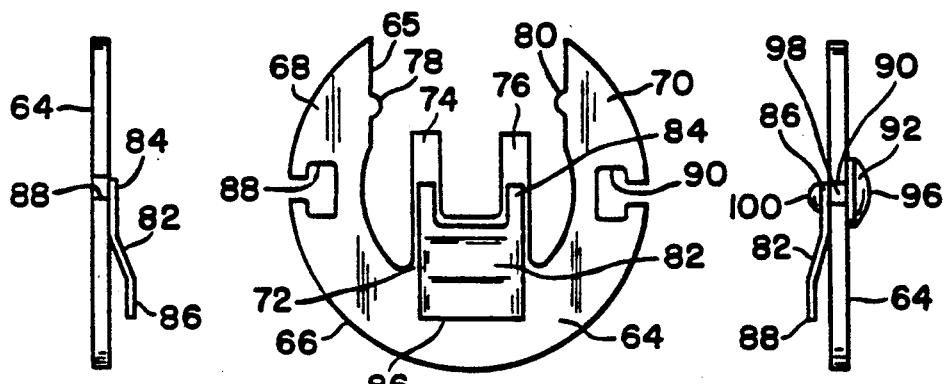
FIG. 4 is a schematic illustration of the key member of FIG. 1.
FIG. 5 is a side view of the key member of FIG. 4.
FIG. 6 is a side view of the key member of FIG. 4 with one of the buttons of a poppet valve secured thereto.

Key member 64 which is as best shown in FIGS. 4, 5 and 6 has a disc member 66 with arcuate legs 68 and 70 formed by a slot 65 which extends to a yoke member 72. Yoke member 72 has legs 74 and 76 which extends through radial slot 38 and is located in groove 58 on plunger 52. Arcuate legs 68 and 70 of disc 66 have sufficient resiliency to expand around the cylindrical peripheral surface 31. Tangs or nibs 78 and 80 on legs 68 and 70, respectively, are located in corresponding axial slots (not shown) on the peripheral surface 31 of cylindrical body 29 to affix the key member 64 to the hub 28 and align buttons 92 of the poppet valve carried by the key member 64 with passageways 32 in hub 28. A spring clip 82 has a first end 84 which is affixed to legs 74 and 76 of yoke member 72 and a second end 86. With key member 64 attached to cylindrical body 29, end 86 engages face 90 of slot 38 and urges key member 64 toward face 91 of slot 38. Leg 68 has a guide slot 88 and leg 70 has a guide slot 90 which are located in plane substantially at 90° to spring clip 86. Buttons 92, only one of which is shown, of poppet valve are located in guide slots 88 and 90. Buttons 92 of the poppet valve have a spherical face 96, which is designed to match seat 33 formed by that portion of hub 28 which surrounds passage 32, center section 98 and a back section 100. Buttons 92 are made of a resilient material which easily conforms to the seat 33 in response to clip spring 82 urging key member 64 toward face 92 of slot 38 in hub 28.

In the servomotor 10 shown in FIG. 1 it is assumed that a source of vacuum is connected to chamber 18 through the check valve 93 attached to shell 12.

In the rest position shown in FIG. 1, wall return spring 43 acts on hub 28 to hold key member 64 against stop 15 on shell 14 and spring clip 82 urges key member 64 toward face 91 of slot 38 of cylindrical body 29. With key member 64 urged toward face 91, buttons 92 on the poppet valve carried by the key member 64 are located on seats 33 to prevent direct communication of fluid between chambers 18 and 20 through passageways 32. In addition, valve return spring 114 of the control valve 50 urges face 62 on plunger 52 against seat 108 to prevent communication of air from the surrounding environment present in bore 30 to chamber 20.

Figure 2:
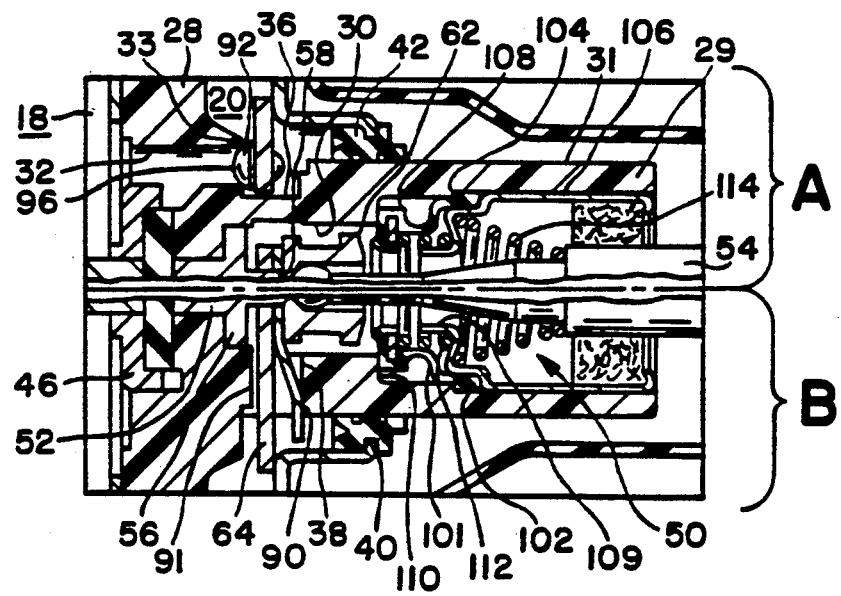
FIG. 2 is an enlarged sectional view of segments A and B of FIG. 1 showing the hub, key member, poppet valve and control valve in an applied position to effect a brake application in response to an input application.

When an operator desires to effect a brake application, an input force is applied to push rod 54. Groove 58 and the resiliency of key member 64 allows plunger 52 to move in bore 30 to initially position seat 108 on stop or shoulder 110 in cylindrical member 29 and thereafter move annular face 62 to move away from seat 108 to allow air present in bore 30 to flow past annular opening 109 to chamber 20 by way of radial slot 38 as shown in FIG. 2. On movement of plunger 52, clip spring 82 acts on key member 64 to hold buttons 92 against seats 33 to continue to seal passageways 32 and prevent air from being evacuated to chamber 18. With air in chamber 20, a pressure differential is created with vacuum in chamber 18 to develop a force across wall 22 which is carried through hub 28 and into reaction disc 48 for generating an output force that is transmitted through push rod 44 to the master cylinder to effect a brake application. The development of the output force continues until the resistance to movement of the master cylinder in the master cylinder balances the input force applied to push rod 54 and moves face 62 on plunger 52 into engagement with atmospheric seat 108 on the annular valve 101. In this balance condition for the control valve 50, spring clip 82 moves key member 64 in groove 58 to continue urging buttons 92 of the poppet valve into engagement with seats 33 on the hub 28 to seal passageways 32 and prevent air from being evacuated from chamber 20.

When the input force applied to push rod 54 terminates, return spring 43 acts on hub 28 to move wall 22 toward shell 14. At the same time, valve return spring 114 acts on push rod 54 to move plunger 52 and key member 64 against face 90 of slot 38 to allow air to be evacuated from chamber 20 by way of passageways 32. Vacuum in chamber 18 quickly evacuates air from chamber 20 and essentially equalizes the pressure in chambers 18 and 20 by the time return spring 43 has moved hub 28 to the position illustrated in FIG. 3. When hub 28 approaches shell 14, the annular surface on key member 64 engages stop 15 on housing 14 to hold plunger 52 in a stationary position. Return spring 45 continues to move hub 28 toward a rest position as shown in FIG. 1. As the hub continues to seat, 33 moves toward buttons 92 carried on the stationary key member 64 to initially restrict fluid communication through passageways 32. When hub 28 reaches its rest position, seats 33 of passageways 32 engage buttons 92 of the poppet valve to completely interrupt fluid communication through passageways 32. In the rest position, annular seat 62 on plunger 52 and the free end 108 of annular poppet 101 will be located adjacent stop 110 to establish a minimum distance for the input push rod 54 to move plunger 52 such that free end 108 of the annular poppet 101 engages stop 110 and annular face 62 on plunger is moved away from the face of the free end 108 to allow air to enter into chamber 20 to effect a desired brake application.

We claim:

1. In a brake booster having first valve means located in a bore in a hub, said first valve means cooperating with key means connected with said hub, said key means engaging stop means of the booster as said hub disposed during a brake release to interrupt fluid communication between a first chamber and a second chamber in the booster when said hub reaches a rest position, the improvement comprising:

a cylindrical body extending from said hub having first and second peripheral slots located thereon;

a first passageway through said hub for directly connecting said first chamber to said second chamber;

a second passageway on said cylindrical body for connecting said second chamber to the surrounding environment through said bore;

a seat located on said hub surrounding said first passageway;

second valve means having poppet means attached to said key means for engaging said seat on said hub to effect said fluid communication interruption between said first and second chambers; and a clip connected to said hub for urging said poppet means toward said seat to seal said passageway during a brake application.

2. In the brake booster as recited in claim 1 wherein said key means includes:

a plurality of projections that snap into said slots on said hub to maintain said poppet means in alignment with said first passageway.

3. In a brake booster having valve means retained in a bore of a hub by key means, said key means on engaging stop means of the booster holding said valve means stationary while said hub moves toward a rest position during a brake release to change the fluid communication relationship between a first chamber and a second chamber from unrestricted to restricted, the improvement comprising:

poppet means connected to said key means for engaging a seat of a direct passageway through said hub between said first and second chambers to effect said restricted fluid communication; and a clip connected to said hub for urging said poppet means into engagement with said seat during a brake application to effect restricted fluid communication between said first and second chambers.

4. In the brake booster as recited in claim 3 wherein said key means includes:

a disc having a yoke which surrounds a groove in a plunger of said valve means, said yoke engaging a land on said plunger to limit the axial movement of said plunger in said bore.

5. In the brake booster as recited in claim 4 wherein said disc further includes:

a plurality of projections which are located in corresponding slots on said hub to align said poppet means with said seat surrounding said passageway.

6. In the brake booster as recited in claim 5 wherein said poppet means includes:

a resilient button located on said disc having a semispherical face which engages said seat to interrupt communication through said passageway.

* * * * *